(12) United States Patent
Allen

(10) Patent No.: US 9,781,053 B1
(45) Date of Patent: Oct. 3, 2017

(54) REQUEST ROUTING AND PROCESSING USING A CANCELLATION TOKEN

(71) Applicant: Amazon Technologies, Inc., Reno, NV (US)

(72) Inventor: Nicholas Alexander Allen, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 325 days.

(21) Appl. No.: 14/019,400

(22) Filed: Sep. 5, 2013

(51) Int. Cl.
| | |
|---|---|
| G06F 15/173 | (2006.01) |
| H04L 12/911 | (2013.01) |
| H04L 29/08 | (2006.01) |
| H04N 1/32 | (2006.01) |
| G06F 17/30 | (2006.01) |

(52) U.S. Cl.
CPC ........ *H04L 47/74* (2013.01); *G06F 17/30386* (2013.01); *H04L 29/08945* (2013.01); *H04L 67/10* (2013.01); *H04N 1/32545* (2013.01)

(58) Field of Classification Search
CPC ......... G06F 17/30575; G06F 17/30424; G06F 17/30; G06F 17/30386; H04L 67/10; H04L 67/1002; H04L 67/1095; H04L 67/1097; H04L 2029/06054; H04L 67/288; H04L 29/08945; H04L 47/74; H04N 1/32545

USPC ....... 709/201, 203, 217, 219, 223, 224, 238, 709/226; 707/713, 769, 770; 718/100, 718/101, 102, 103, 104, 105
See application file for complete search history.

(56) References Cited

U.S. PATENT DOCUMENTS

| | | | | |
|---|---|---|---|---|
| 6,606,643 | B1* | 8/2003 | Emens et al. ................. | 709/203 |
| 6,898,609 | B2* | 5/2005 | Kerwin ......................... | 707/634 |
| 7,069,325 | B1* | 6/2006 | Lu et al. ....................... | 709/226 |
| 2002/0112036 | A1* | 8/2002 | Bohannon et al. ........... | 709/220 |
| 2004/0083215 | A1* | 4/2004 | de Jong ............................ | 707/7 |
| 2004/0177221 | A1* | 9/2004 | Bridge .......................... | 711/114 |
| 2010/0042675 | A1* | 2/2010 | Fujii ............................. | 709/203 |
| 2013/0110909 | A1* | 5/2013 | Dean ............................ | 709/203 |
| 2013/0332930 | A1* | 12/2013 | Towata ......................... | 718/102 |

\* cited by examiner

*Primary Examiner* — Liangche A Wang
*Assistant Examiner* — Johnny Aguiar
(74) *Attorney, Agent, or Firm* — Davis Wright Tremaine LLP

(57) ABSTRACT

Remote computing resource service providers allow customers to reduce overhead by using computer hardware resources of the service provider to execute a variety of operations. Computer hardware resources of the service provider may be widely distributed between various geographic locations and may have differing computing capacity. Therefore it may be advantageous to coordinate processing of customer operations between computer hardware resource locations of the service provider. Customer requests to perform operations may be distributed to various locations and coordinated by the service provider using various techniques such as a cancellation manager to terminate unprocessed requests distributed to the various locations once one or more of the distributed requests have been processed.

22 Claims, 8 Drawing Sheets

REQUEST ROUTING AND PROCESSING USING A CANCELLATION TOKEN

BACKGROUND

Electronic requests may be serviced in a variety of ways. While numerous factors may affect request processing speed, generally, the closer computing capacity for processing a request is to the requestor, the more quickly the request can be processed. As a result, content delivery networks (CDNs) have become a popular tool for providing the advantages of geographic proximity using distributed request processing capabilities. Despite their numerous advantages, however, CDNs have limited abilities. CDNs, for example, are often implemented with computing resources in multiple Internet points-of-presence (POPs), where the POPs may be tightly capacity constrained. These constraints may limit the use of CDNs to primarily serve static content requests. As a result, some dynamic content requests may be routed to one or more central facilities, the effect of which serves to obviate some advantages of the CDN.

BRIEF DESCRIPTION OF THE DRAWINGS

Various embodiments in accordance with the present disclosure will be described with reference to the drawings, in which.

DETAILED DESCRIPTION

Figure 1:
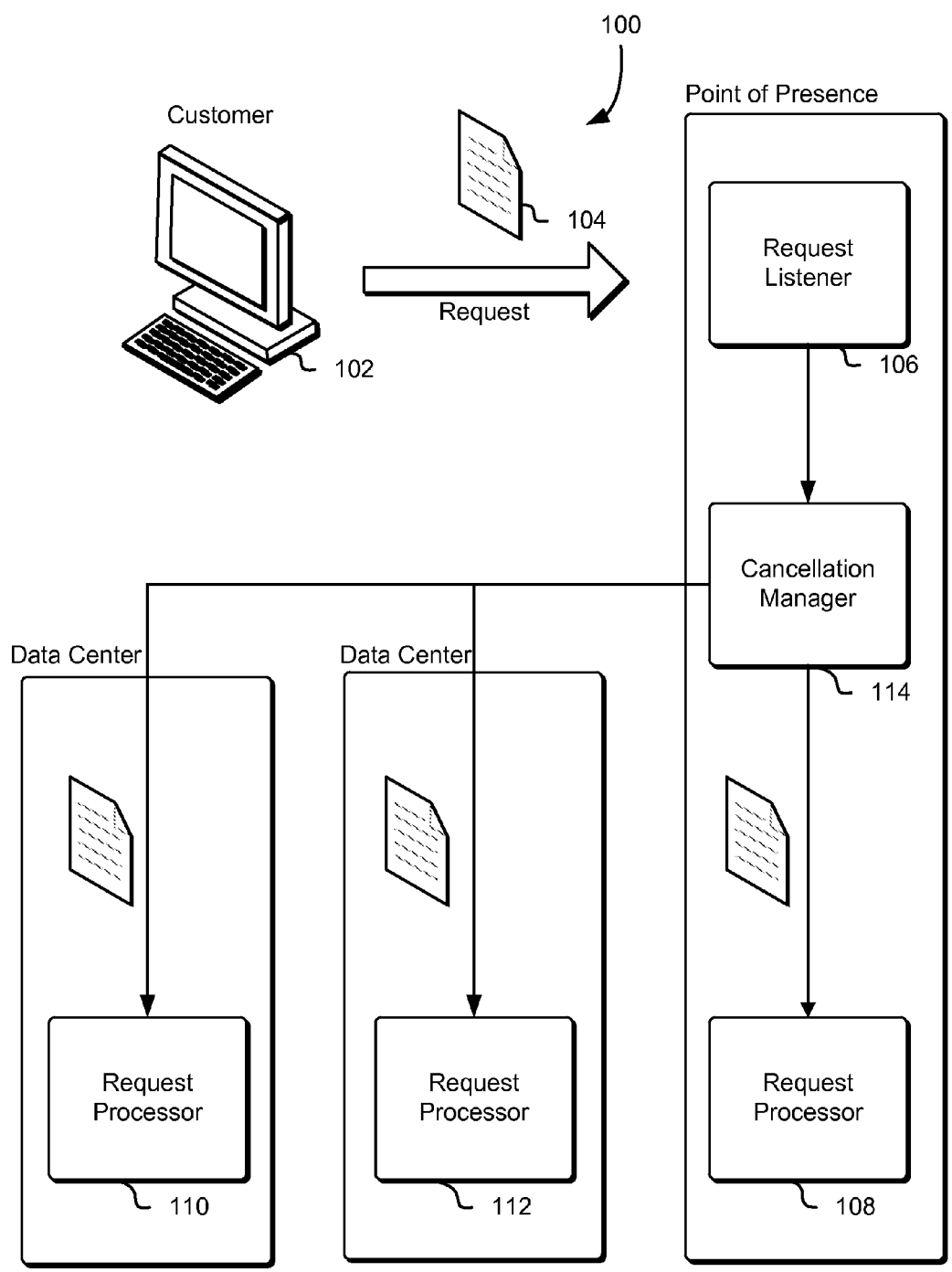
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for conditionally processing short term idempotent requests at one or more networked locations. Latency in processing requests (also referred to simply as requests) may be reduced by transmitting copies of the request to nearby network locations with greater computing capacity. In various embodiments, customers may transmit requests to be processed on remote computing resources operated by the computing resource service provider. The service provider may operate remote computing resources at a variety of geographic locations connected by a network. These locations may contain different computing resources and have different computing capacities. Requests may be directed to the nearest remote computing resource location and on occasion, the request may be processed faster if copies of the request are transmitted to other remote computing resource locations for conditional processing. In order to enable conditional processing of the request at various locations a cancellation token may be used to coordinate request processing among the various locations.

A cancellation manager may generate a cancellation token for a particular request and coordinate signaling between the various remote locations. In various embodiments, signaling between the various remote locations may be accomplished through the use of appropriately configured application program interface (API) calls. Furthermore, the customer may submit a processing request using appropriately configured API calls. The service provider may operate one or more listening devices connected to the network capable of receiving the processing request submitted by the customers. While customers are used for illustrative purposes throughout the present disclosure, the techniques described in the present disclosure are applicable to requestors in general and to any type of request such as a request to retrieve data from a network server. The processing request may then be transmitted to a local cancellation manager to coordinate processing of the request. Once the processing request has been received by the local cancellation manager, the local cancellation manager may then immediately insert the processing request into a local request queue. The local request queue may manage processing requests for the local request processor. In various embodiments, the cancellation manager may wait a predetermined amount of time before creating a local cancellation token. If the request is not processed within the predetermined amount of time the cancellation manager may then replicate and transmit the processing request to one or more remote cancellation managers, create a local cancellation token and associate the processing request with the cancellation token.

Once a replicated processing request is received by the remote cancellation manager, the remote cancellation manager may immediately queue the replicated processing request in the remote request queue and create a remote cancellation token. The remote cancellation manager may also further replicate the processing request and transmit the processing request to one or more other remote cancellation managers. Transmission of the processing requests between local and remote cancellation managers may be done in serial or in parallel. For example, the local cancellation manager may send multiple copies of the processing requests to multiple remote cancellation managers in parallel, e.g. a hub and spoke arrangement of request processors. Once the remote cancellation manager has created the remote cancellation token it may then be associated with the replicated processing request in the remote request queue. In various embodiments, the remote cancellation manager may associate the replicated processing request with the remote cancellation token, as well as, communicate with other cancellation managers in order to conditionally process the requests.

Once the processing request has been removed from the local request queue a signal may be sent to the local cancellation token indicating that the processing request has been removed from the queue. The cancellation token may then propagate the signal to one or more remote cancellation managers. Once the signal is received by the remote cancellation manager, the remote cancellation manager may issue a command to the remote cancellation token to remove the replicated processing request from the remote request queue. The cancellation token may then remove the replicated processing request from the remote request queue and indicate completion to the remote cancellation manager. In various embodiments, the cancellation manager may then disassociate the remote cancellation token from the replicated processing request. The service provider may then transmit the processed request to the customer.

In various other embodiments, the replicated processing request may be removed from the remote request queue for processing. Once the replicated processing request has been removed from the remote request queue, a notification may be sent to the remote cancellation token indicating that the request is being processed. The remote cancellation token may then notify one or more other request queues indicating that the processing request has been removed from the queue for completion. The other request queues may then remove the processing request from the respective queues. In various embodiments, different schemes for controlling the operation of the cancellation managers, cancellation tokens and other components of the present disclosure may be used. For example, an m-out-of-n scheme may be implemented such that a certain number of the replicated request must be completed before a signal indicating cancellation is propagated. Other schemes that may control or alter the actions of various components of the request processing system of the present disclosure, including prioritization scheme in which queued requests may be prioritized or deprioritized based on one or more factors. For instance, copies of the request may be prioritized lower than the original and, in an m-out-of-n scheme described above, requests may be deprioritized based at least in part on a cancellation signal being received and the request processor transmitting the signal.

FIG. 1 shows an illustrative example of an aspect of an improved request processing system in accordance with various aspects of the present disclosure. As noted above, the techniques described herein are applicable to processing requests using remote computing resources, particularly in environments where remote computing resources are operated by a computing resource service provider and the computing resources are geographically distributed over a network. Accordingly, FIG. 1 shows an example of the customer 102 sending a request 104 for processing. The request 104 may be any stateless or idempotent processing request. For example, the request maybe a request to pull data, database entries, data checking, error correction, requests to compare calculation, failover requests, image processing calculations or any other request suitable for limited tenancy. In various embodiments, the request 104 may be an appropriately configured API call. Furthermore the request may be generated by the customer 102, an application operated by the customer, a virtual computer system instance operated by the customer, a service of the service provider on behalf of the customer or any other system capable of generating a request. Returning to FIG. 1, the request 104 may be received by a request listener 106, the request listener 106 may be responsible for translation and routing of the processing request to the appropriate system or component thereof.

The request listener 106 may be located at a point of presence on the network. Point of presence may be widely distributed edge points on the network capable of receiving request 104 from customers 102. A request 104 may be directed to the nearest point of presence to the customer 102 submitting the processing request 104 in an attempt to reduce latency. The request may be directed to the nearest point of presence using a domain name system (DNS) resolver or similar routing techniques. Once the request 104 is received by the request listener 106, the request listener 106 or some other system of the service provider may determine the appropriate service or system of the service provider for processing the request. The request 104 may contain information corresponding to the system or service for processing the request. For example, the request 104, as described above, may be an appropriately configured API call, the API call may contain one or more parameters indicating the system or service which is to process the request. In various embodiments, the request listener 106 may parse the request and determine a system or service to process the request based at least in part on the parsed request.

Returning to FIG. 1, once the request listener 106 has determined the associated system or service for processing the request, the request listener 106 may direct the request to a particular request processor 108-112 (also referred to as request processing entities). The request listener 106 may direct the request to a request processor 108-112 using a variety of different methods such as proximity to the request listener, hard coding of the request processor to the request listener, load of the particular request processor or any other suitable selection method for directing a request. In various embodiments, the request processor may have an associated cancellation manager 114 or similar managements system. The request listener 106 may then register the request with a cancellation manager 114 associated with the particular request processor 108. The cancellation manager may monitor and manage the lifecycle of the request 104. Requests 104 may be processed by one or more systems of the service provider, the systems may be configured with the ability to synchronously process the requests. For instance, the system may immediately process the request and provide a response indicating completion (e.g. with the requested data). In other embodiments, the systems of the service provider may process requests asynchronously, such that one or more other requests may be required in order to receive the results of completion of the first request. In various embodiments, the request listener 106 may register the request 104 with the cancellation manager before directing the request 104 to the appropriate request processor 108. Once the cancellation manager has received registration of the request 104 for processing, the cancellation manager 114 may queue the request with the particular request processor 108 associated with the cancellation manager. Each request processor may be associated with a cancellation manager and a queue (not shown in FIG. 1 for clarity).

The cancellation manager 114 once the request has been queued may wait for a predetermined duration before performing another action corresponding to the particular request. During this timeout period the request 104 may be removed from the queue by the request processor 108 and processed. If the request is processed during the timeout period the result of the request may be returned to the customer 102 and the cancellation manager may unregister the request so no further processing is completed for the request 104. However if the request is not processed during the timeout period the cancellation manager 114 may perform one or more actions to facilitate processing of the request. For example the cancellation manager 114 may replicate the request 104 and transmit the replicated request to various points on the network for processing. The cancellation manager may also propagate the cancellation signaling (to be discussed in connection to FIG. 2) once the request has been removed from the queue or has been processed.

In various embodiments, the request registered with the cancellation manager 114 may be duplicated and distributed over the network to one or more remote locations. The remote location may be a large data centers on the network, points of presence or any other remote computing resources connected to the network. The remote location may contain request processors 110 and 112 for processing the replicated request transmitted by the cancellation manager 114. In various embodiments, the request processors 110 and 112 may have associated cancellation managers and/or queues to facilitate request handling and processing. The cancellation manager may create a cancellation token associated with the one or more duplicated requests. The cancellation token may be associated with the request by including identification information for the cancellation token in metadata for the request in the request queue. Creation of the cancellation token by the cancellation manager 114 may occur in parallel or in serial with the timeout period described above. The cancellation token created by the cancellation manager 114 may be a process running on the system, may be an entry into a database or any other suitable means for associating a request. The database may be any system for storing and associating data, such as information corresponding to cancellation tokens, local resources or processing requests.

Figure 2:
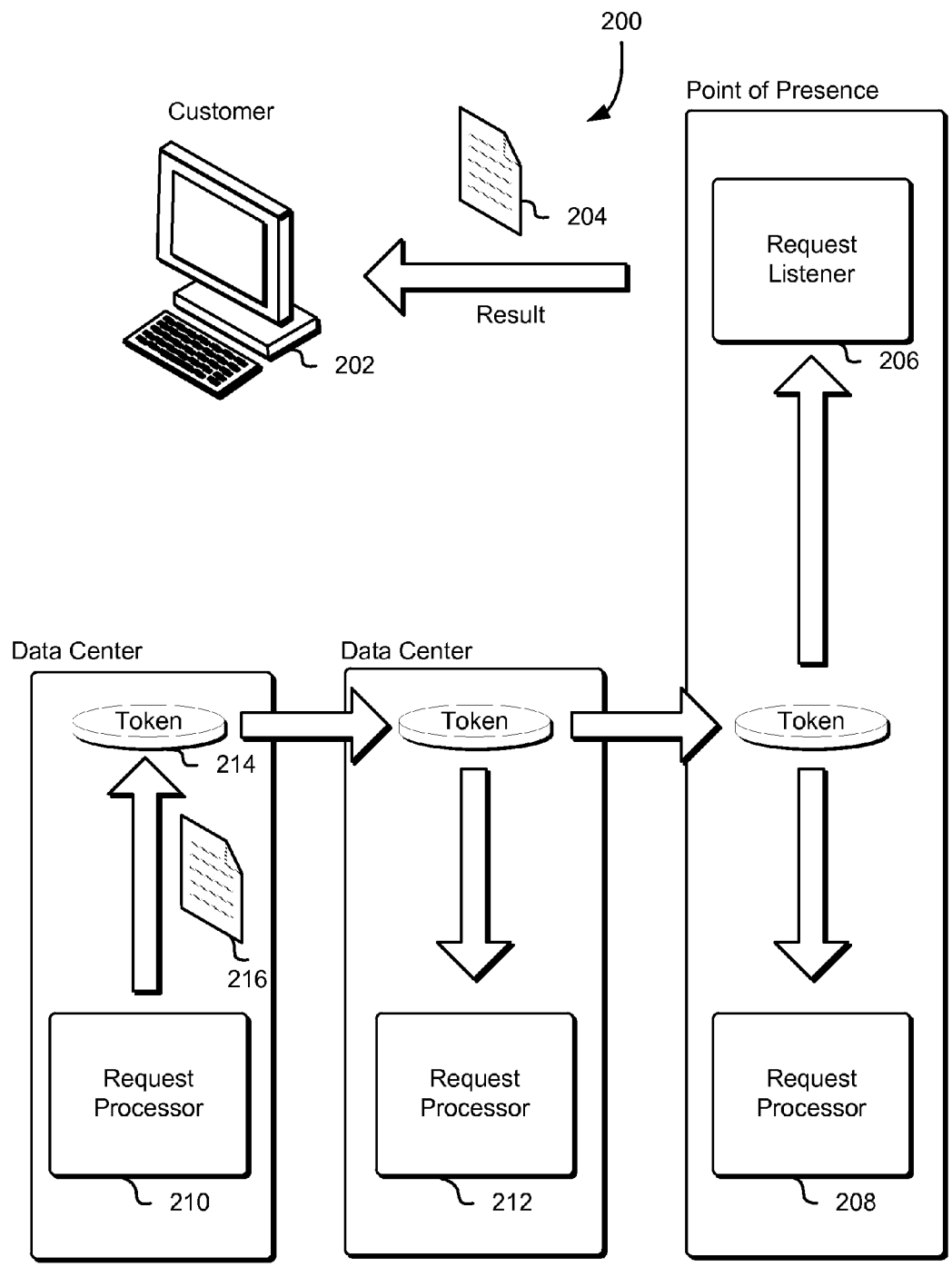
FIG. 2 shows a diagram illustrating various aspects of the present disclosure.

FIG. 2 shows an illustrative example of an aspect of an improved request processing system in accordance with various aspects of the present disclosure. Specifically FIG. 2 illustrates an environment in accordance with the request processing procedure established in FIG. 1, particularly once a request has been committed for processing or processing of the request has been completed. Accordingly, FIG. 2 shows an example of the customer 202 receiving a processed request 204 from the service provider. The processed request 204 may be transmitted to the customer 202 by the request listener 206. The request listener 206 may be the same request listener that received the request from the customer. The request may be processed by one or more request processors 208-212. The example in FIG. 2 shows the request being processed by request processor 210 and the result 216 being transmitted to the customer 202. In various embodiments, once the request processor 210 has committed to processing the request a cancellation signal may be sent to the cancellation token 214 (referred to simply as token in FIG. 2 for clarity). The signal may be generated by invoking API calls for the cancellation manager associated with the request processors 208-212.

In various embodiments, the cancellation token 214 may be linked to one or more remote cancellation tokens. The cancellation tokens may be linked through a web service or other system suitable for propagating signals between one or more resources. In various embodiments, the cancellation token may be linked to other resources such as the cancellation manager, request processor, processing request, request queue or other system suitable for use with the improved request processing of the present disclosure. Each resource may implement responses to a received signal such as cancelling the processing request, cancelling performance of the processing request, forwarding the cancellation signal or any other appropriate response to receiving the cancellation signal. Returning to FIG. 2, once request processor 210 has removed the processing request from the request queue it may then signal the cancellation token 214 indicating that the request has been committed for processing.

In various embodiments, the request processor 210 may signal the cancellation token 214 by generating an appropriately configured API call to the cancellation manager for which it is associated. The cancellation manager may have created the cancellation token itself or received the cancellation token from another system such as another cancellation manager located at a remote location. The request processor may configure the API call using information included in the processing request, such information may be included in the metadata of the request. For example, with reference to FIG. 1, when the cancellation manager 114 creates one or more duplicate requests for remote processing, the duplicate requests may include in the metadata of the request identification information for the serialized cancellation token corresponding to the particular duplicate request. The request processor 210 may retrieve the identification information for the cancellation token from the metadata included in the particular duplicated processing request and transmit the retrieved identification information to the cancellation manager along with information indicating that the request processor 210 is processing the request.

Once the cancellation manager has received information identifying the cancellation token and indicating processing has been initiated, the cancellation manager may then direct a signal to the cancellation token. The cancellation manager may signal the cancellation token using a variety of signaling methods such as using one or more interrupts, networking protocols, API calls or any other suitable signaling method. For example, the cancellation manager may, using a directory service or some other lookup service, determine a physical location for the cancellation token based at least in part on the cancellation token identifier received from the request processor 210. Information corresponding to the cancellation token may be stored in a uniform resource locator (URL) or uniform resource identifier (URI) and the cancellation manager may direct the signal based at least in part on information contained in the URL or URI.

Once the cancellation token 214 has received the cancellation signal, the cancellation token may cancel at least one other linked resource and/or may further propagate the cancellation signal. For example, the cancellation token 214 may remove the processing request from the request queues corresponding to request processors 212 and 208. In another example, the cancellation token may simply forward the cancellation signal to the cancellation manager corresponding to request processors 212 and 208, the cancellation manager may then remove the processing request from the request queues or propagate the signal to the cancellation token so that the cancellation token can remove the processing request from the request queues. The cancellation token 214 may also delete the processing request if it has not been queued yet or terminate processing of a request if the processing request has been removed from the queue but processing of the request has not yet been completed. For example, cancellation token 214 may receive a cancellation signal from some other system, such as the cancellation manager described in connection with FIG. 1, the signal being received after the processing request has been removed from the queue for processing but before the request processor 210 has signaled the cancellation manager. The cancellation token may terminate processing of the processing request by the request processor 210.

Figure 3:
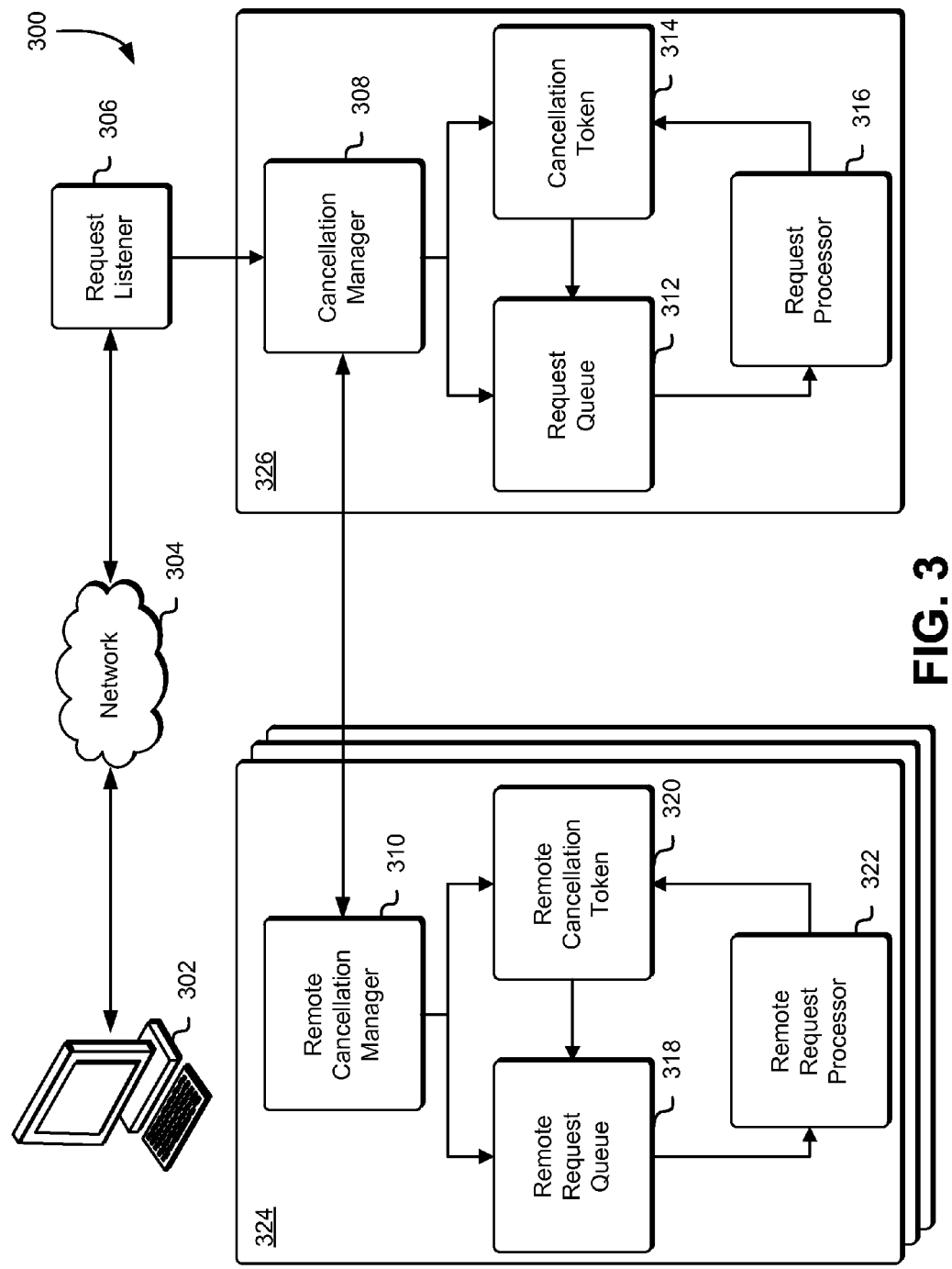
FIG. 3 shows an illustrative example of an environment in which various embodiments of the present disclosure may be practiced.

FIG. 3 depicts aspects of remote computing resources operated by the service provider in accordance with at least one embodiment. The service provider may have computing resources at multiple geographic locations 324 and 326. The distinct geographic locations 324 and 326 may be in different legal jurisdictions and be different facilities (e.g. distinct data processing facilities). In various embodiments, the locations 324 and 326 may have a variety of different computing resources with different processing capacities. For example, location 326 may be a point of presence with limited computing capacity and low network latency relative to customer 302. Location 324 may be a data center with greater computing capacity and higher network latency relative to customer 302. The customer 302 may send a processing request to the service provider over a network 304, such as the Internet. A request listener 306 operated by the service provider may receive a request from the customer or on behalf of the customer over the network 304. The request may be directed to a particular request processor, such as request processor 316. The customer may direct the request to the particular request processor or a device along the network path may direct the request to the particular request processor based at least in part on geographic proximity. In various embodiments, devices along the network path may direct the request to a particular request processor based on other factors such as network latency or available processing capacity.

Returning to FIG. 3, once the processing request is received by the request listener 306, the request listener 306 may then register the processing request with the cancellation manager 308. In various embodiments, the request listener 306 may be in the same geographic location 326 as the cancellation manager 308. The cancellation manager 308 may be implemented in various ways, such as hardware devices or virtual computer systems executing on remote computing resources at location 326. The cancellation manager 306 may then queue the processing request received from the request listener 306 into the request queue 312. The cancellation manager 308 may wait for a predetermined timeout period before creating the cancellation token 314. The timeout period may enable the cancellation manager 308 to determine if the request processor 316 has immediate processing capacity in order to process the request the cancellation manager 308 inserted into the request queue 312. If the request processor 316 does not have immediate processing capacity to handle the request, the cancellation manager 308 may then generate a cancellation token 314 for the corresponding processing request. The cancellation manager 308 may, in various embodiments, create the cancellation token in parallel with or during the timeout period.

The cancellation token 314 may be associated with the processing request inserted into the request queue 312 by the cancellation manager 308. The cancellation token 314 may be associated or linked to other resources such as the request queue 312 and the request processor 316. The cancellation manager 308 may also create duplicate requests for distribution to remote cancellation manager 310. Although for clarity only one remote cancellation manager 310 is shown, the cancellation manager 308 may send duplicate processing requests to a plurality of remote cancellation managers in serial or parallel fashion. For example, the cancellation manager may send a duplicate request to the remote cancellation manager, the remote cancellation manager may in turn send another duplicate request to another remote cancellation manager. Returning to FIG. 3, the cancellation manager 308 may associate the cancellation token 314 with the processing request using an opaque identifier such as a universal identification number.

In various embodiments, at least one of the plurality of remote cancellation managers may receive the duplicate processing request from the cancellation manager 308. Once the remote cancellation manager 310 receives a duplicate processing request, the remote cancellation manager 310 may insert the duplicate processing request into the remote processing queue 318. Upon inserting the duplicate processing request into the remote request queue 318, the remote cancellation manager 310 may create the remote cancellation token 320 and associate the remote cancellation token 320 with the duplicate processing request inserted into the remote request queue 318. In various embodiments, the duplicate processing requests may have a lower priority in the remote request queues due at least in part to the fact that the requests are duplicates. The remote cancellation token 320 may be linked to the cancellation token 314 in such a way that signaling one of the cancellation tokens may propagate the signal to all of the cancellation tokens. For example, a web service operated by the service provider may be used to distribute the signal to all of the cancellation tokens, the cancellation managers may register any cancellation token created with the web service upon creation of the cancellation token or shortly thereafter.

Returning to FIG. 3, at some point in time processing capacity may become available as a request processor such as remote request processor 322 or request processor 316. When processing capacity becomes available the processing request may be removed from the queue and committed for processing to the request processor. For example, remote request processor 322 may remove the duplicate processing request from the remote request queue 318 and begin processing the request. The remote request processor 322 may wait until completion of the processing request before signaling the remote cancellation token 320 or may signal the remote cancellation token 320 upon removal of the processing request from the remote request queue 318. The remote request processor 322 may signal the remote cancellation token 320 by transmitting an appropriately configured API call to the remote cancellation manager 310. The remote cancellation manager 310 may then propagate the cancellation signal to the remote cancellation token 320.

Once the remote cancellation token 320 receives a cancellation signal, the remote cancellation token 320 may cancel processing requests at one or more linked resources. For example, once the remote cancellation token 320 receives a cancellation signal indicating the remote request processor 322 is processing the duplicate processing request, the remote cancellation token 320 may remove the processing request from the request queue 312. In various embodiments, the remote cancellation token 320 may signal the cancellation manager 308 such as by propagating the cancellation signal. The cancellation manager 308 may then propagate the signal to the cancellation token 314 and the cancellation token 314 may remove the processing request from the request queue 312. The cancellation token may send an interrupt to one or more request processors, indicating processing of the request may be terminated.

Various cancellation schemes may be used to control the operation of various systems involved in processing the request from the customer. For example, multiple completed or committed requests may be required before processing of a request may be canceled. In such an environment, a counter may be maintained by the cancellation manager or some other service in order to track the number of completed request. Two or more distinct cancellation signals may be used to differentiate between signaling of a committed request and signaling that the requisite number of request have been completed and outstanding requests may be terminated. The signal may, in various embodiments, include information uniquely identifying the request processor which committed to processing the request. The cancellation manager 308 may wait until the cancellation signal indicating the request has been committed for processing is received from the required number of remote cancellation tokens 320, incrementing the counter upon receipt of each cancellation signal. The cancellation manager 308 or other suitable component of the request processing system may also deprioritize queued requests every time a cancellation signal is received. The request prioritization may be altered by varying amounts based at least in part on the system that transmitted the cancellation signal. For example, a cancellation signal received from a particular data center may cause the priority of the locally queued copy to decrease more than a cancellation signal received from other data centers.

Figure 4:
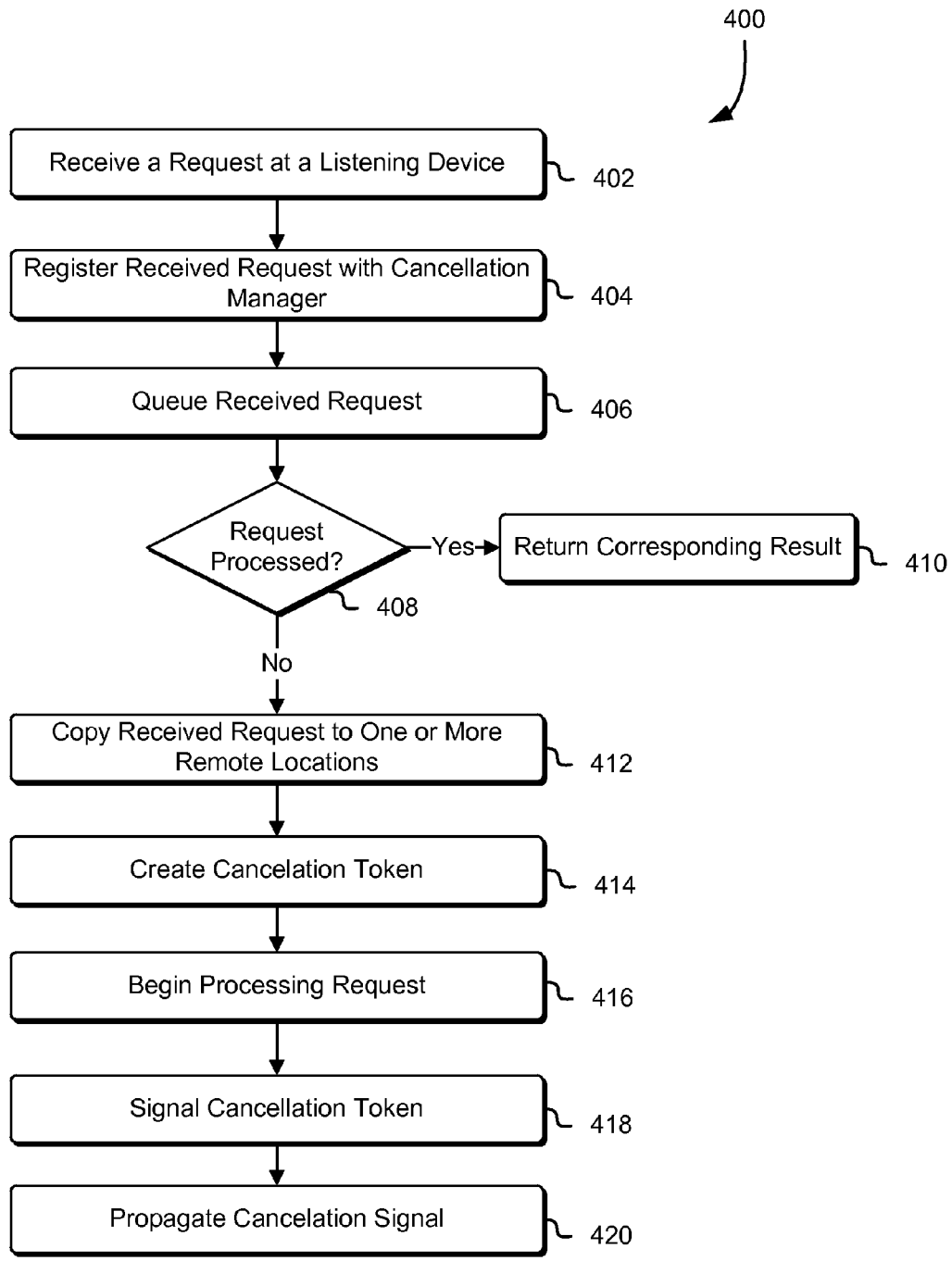
FIG. 4 shows an illustrative example of a process for processing a request in accordance with at least one embodiment.

FIG. 4 shows an illustrative example of process 400 which may be used to complete processing requests received over a network. The process 400 may be performed by any suitable system, such as by a system comprising the request listener 306, the cancellation manager 308, the remote cancellation manager 310, the request processor 316 and the remote request processor 322, as described above in connection to FIG. 3. Returning to FIG. 4, in an embodiment, the process 400 includes receiving a request at a listening device 402. Multiple listening devices may be distributed over various geographic locations, the listening devices capable of communicating with customers of the service providers. In still other embodiments, the service provider may operate a centralized listening device for processing communications with the customer. Returning to process 400, once the listening device receives a request 402, the listening device may then register the request with a local cancellation manager 404. The cancellation manager may manage the lifecycle of the request and the interaction between various systems of the present disclosure.

The local cancellation manager, may queue 406 the request registered by the listening device. The request may be queued in the local request queue for the local request processor. The cancellation manager or some other system may, in various embodiments, manage the request queues. Once a processing request has been queued 406 by the cancellation manager, the cancellation manager may initiate a timeout period to enable the local request processor to take ownership of the processing request if the local request processor has sufficient capacity in order to process the request. This timeout period also enables the cancellation manager to avoid creating unnecessary duplicate copies of the processing request if the local request processor has sufficient processing capacity to handle the request. If the local request processor takes ownership of and/or completes the requested processing, the result may be returned 410 to the customer or application which submitted the request.

In various embodiments, if the local request processor does not have the capacity to process the request before the termination of the timeout period 408, the local cancellation manager may then immediately copy the request to one or more remote cancellation managers 412. The cancellation manager may schedule one or more replicas of the processing request with corresponding remote processors, each remote processor being associated with one of the replicas of the processing request. The local cancellation manager may then transmit the replicas of the processing request to the corresponding remote cancellation manager for each of the remote request processors designated in the replicated processing request. The cancellation manager may use one or more selection methods to select remote cancellation managers to send the request to, based at least in part on information regarding the remote cancellation managers. The local cancellation manager may include in the replicated processing request unique identification information for a local cancellation token in order to facilitate propagating of the cancellation signal directly to the local cancellation token.

The local cancellation manager may then create a local cancellation token 414, the local cancellation token being associated with the processing request in the local request queue. In various embodiments, the local cancellation manager may associate the local cancellation token with the processing request by adding additional data to the processing request in the local request queue. At some point in time the processing request will be removed from either the local request queue or remote request queue and the corresponding request processor may begin completing the request 416. The request processor that begins processing the request may signal 418 the corresponding cancellation manager indicating that processing has been initiated. The request processor may obtain information identifying the cancellation token from the request and transmit the identifying information along with the cancellation signal 418 to the corresponding cancellation manager. The cancellation manager may then receive the cancellation signal and information indicating the cancellation token associated with the processing request being processed by the request processor and propagate the cancellation signal to the identified cancellation token 420.

Numerous variations of the process 400 may be implemented in accordance with at least one embodiment of the present disclosure. For example, the request processor may transmit the cancellation signal directly to the cancellation token. The cancellation token may further propagate the cancellation signal to one or more resources connected to the cancellation token such as a request processor or request queue. The request processor may be configured such that the cancellation signal is only transmitted after the request is completely processed. The cancellation manager may wait for a predetermined number of request processors to commit to processing before further propagating the cancellation signal.

Figure 5:
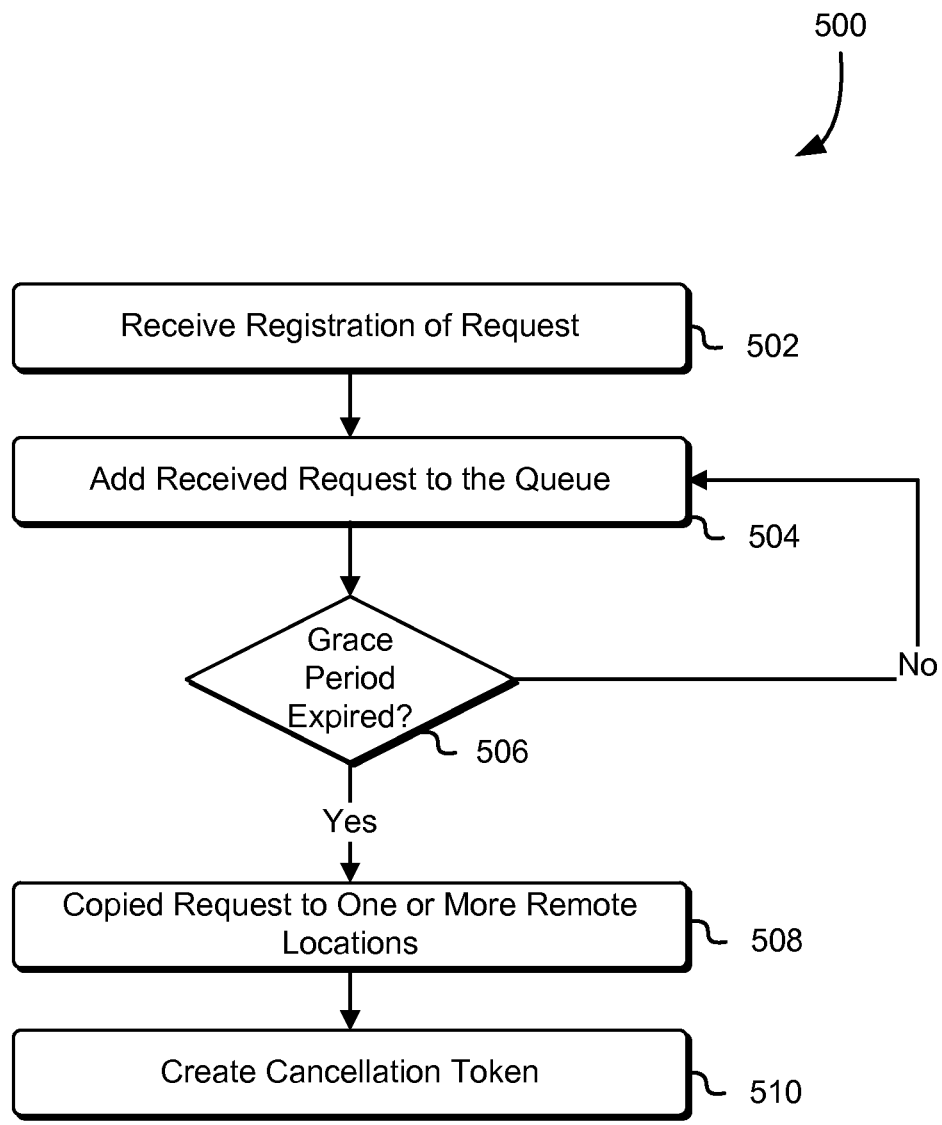
FIG. 5 shows an illustrative example of a process for processing a request in accordance with at least one embodiment.

FIG. 5 shows an illustrative example of process 500 which may be used by the local cancellation manager to manage the life cycle of a processing request. The process 500 may be performed by any suitable system, such as by a system comprising the cancellation manager 308, described above in connection to FIG. 3. Returning to FIG. 5, in an embodiment, the process 500 includes receiving registration of a processing request 502. The cancellation manager may receive the request along with or as registration of the request. Once received the processing request may be placed into a request queue 504. Once the processing request is initially queued a predetermined grace period 506 may be used to ensure extra work is not unnecessarily committed. For example, the cancellation manager may wait a short grace period, such as ten milliseconds, to allow the request processor time to immediately process the request if the capacity is available. The cancellation manager may, during the grace period, initiate creation of duplicate request and the cancellation token.

Once the grace period has expired 506 the processing request may be copied to one or more remote locations 508. The remote location may be hardwired into the system or may be determine by any suitable means, such as network latency as described above. The copied request may have additional information associated with the request indicating the location of the cancellation manager responsible for the cancellation token. The cancellation token may not have been created before the additional information is associated with the request. Once the copies of the processing request have been created and/or transmitted to the one or more remote locations, the cancellation token may be created 510. The cancellation token may be associated with the copied request and/or one or more linked resources. In various embodiments, the cancellation token may be created before the requests are copied.

Figure 6:
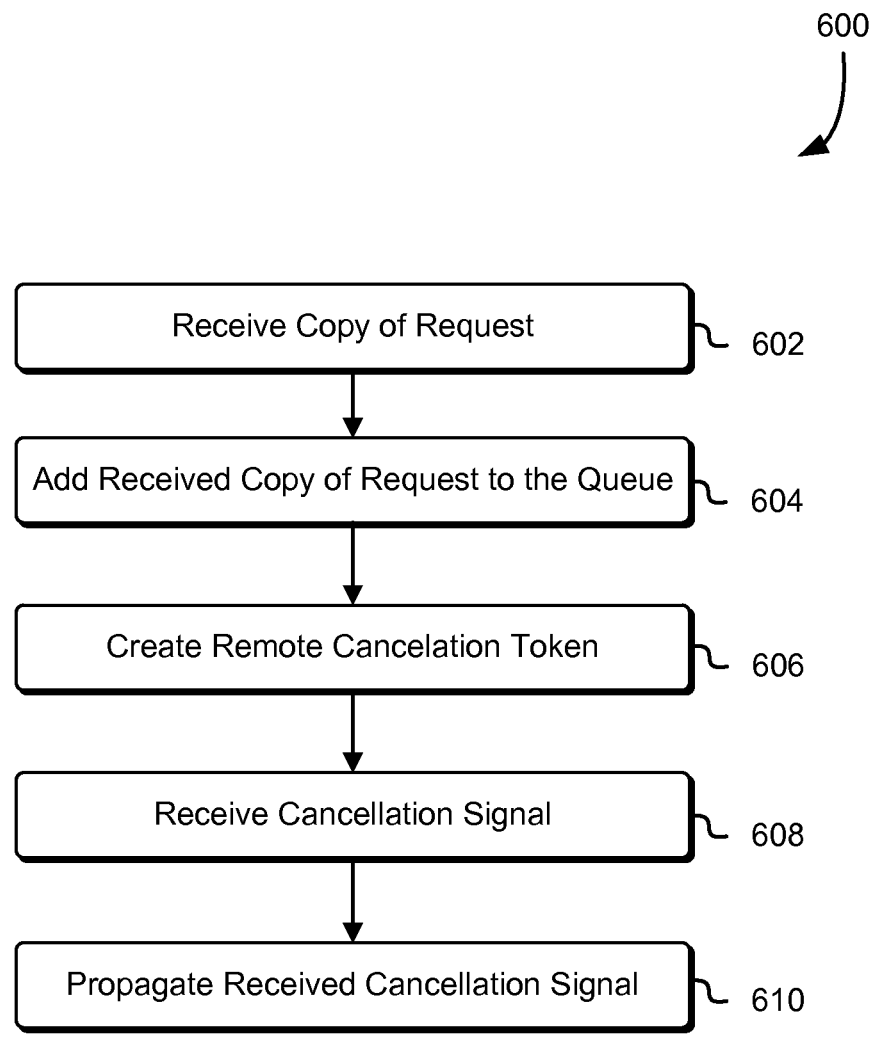
FIG. 6 shows an illustrative example of a process for processing a request in accordance with at least one embodiment.

FIG. 6 shows an illustrative example of process 600 which may be used by the remote cancellation manager to manage the life cycle of a processing request. The process 600 may be performed by any suitable system, such as the remote cancellation manager 310, described above in FIG. 3. Returning to FIG. 6, in an embodiment, the process 600 includes receiving a copy of the processing request 602. The copy of the processing request may be received from another cancellation manager somewhere on the network operated by the service provider. The received copy of the request may be added to the request queue 604 for the request processor associated with the remote cancellation manager that has received the copy of the processing request. Once the copy of the processing request has been added to the queue 604 the cancellation token 606 may be created and associated with the queued copy of the processing request.

At some point after processing requests are queued, one or more request processors may begin and/or complete processing the requests, and transmit the cancellation signal. In various embodiments, the cancellation manager may receive the cancellation signal 608 and propagate the signal 610 to one or more other systems. For example, the cancellation manager may receive the cancellation signal from a request processor and further propagate the signal to the cancellation token associated with the request which the request processor has committed to processing. The cancellation manager may propagate the cancellation signal to other cancellation managers at various other remote locations. The cancellation manager may determine which other cancellation managers to propagate the signal to, based at least in part on, which other cancellation managers the cancellation manager transmitted the copy of the processing request to and propagate the signal to those cancellation managers.

Figure 7:
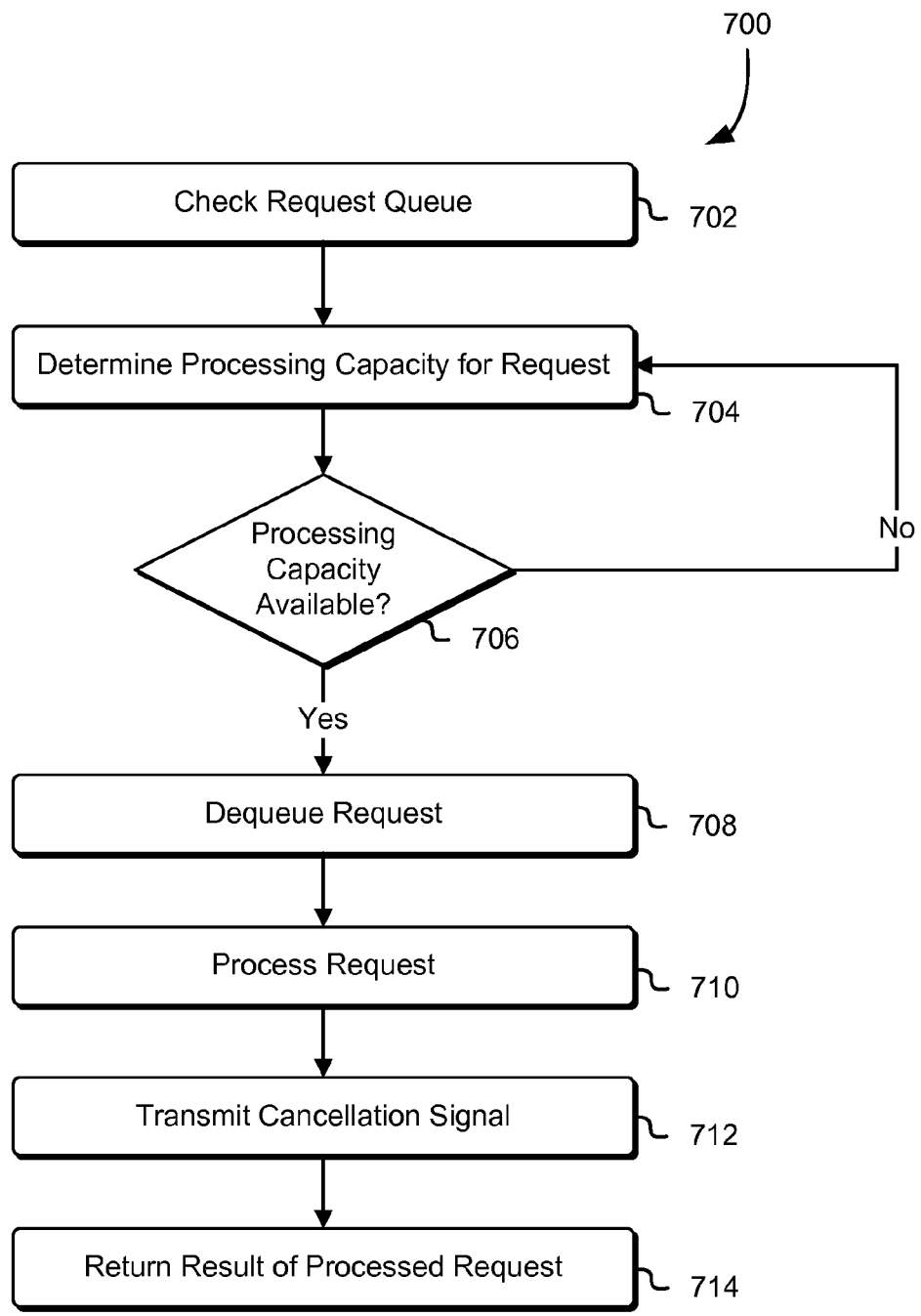
FIG. 7 shows an illustrative example of a process for processing a request in accordance with at least one embodiment.

FIG. 7 shows an illustrative example of process 700 which may be used by the request processor and/or request queue to manage processing requests. The process 700 may be performed by any suitable system, such as request processor 316 or remote requests processor 322, described above in connection to FIG. 3. Returning to FIG. 7, in an embodiment, the process 700 includes monitoring the request queue to determine if there are request to process 702. The process 700, may then determine if there is sufficient processing capacity to process the request 704. If there is enough capacity to process the request 706, the request may be removed from the queue 708 and sent to the request processor. If there is insufficient capacity to process the request 706, process 700 may continue by again determining if there is sufficient capacity to process the request 704. In various embodiments, the request queue or a management subsystem thereof may monitor the processing capacity of the request processor and determine if the request processor has sufficient capacity.

Once a request has been removed from the queue 708 the request processor has committed to processing the request 710. The request processor may immediately transmit the cancellation signal 712 to the cancellation manager or some other appropriate system. For example, once the processing request is removed from the queue by the request processor, the request processor may read the location of the cancellation token from the metadata associated with the processing request, and transmit the cancellation signal directly to the cancellation token. Returning to FIG. 7, once the cancellation signal has been transmitted 712, the request processor may complete processing of the request and return the result 714.

Figure 8:
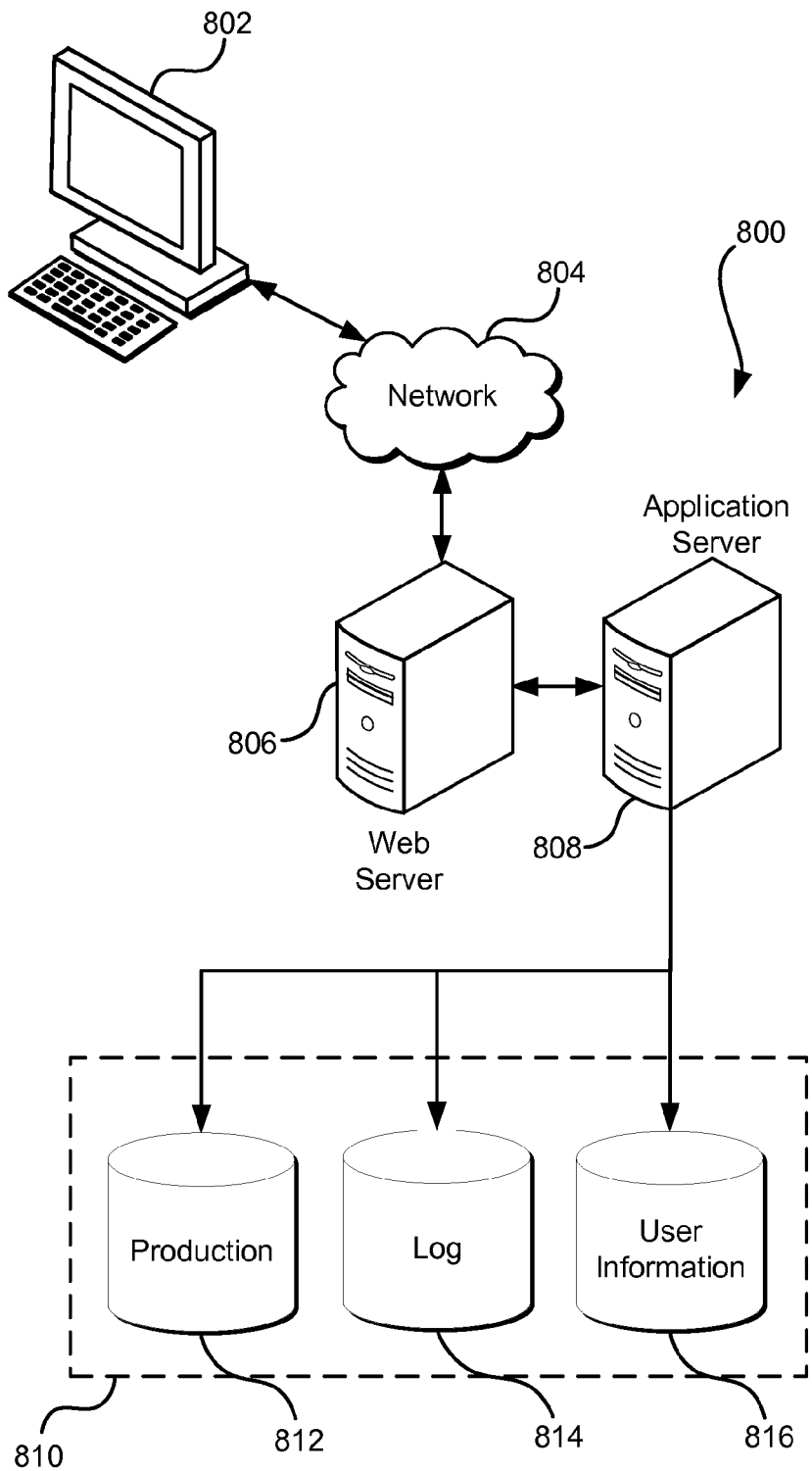
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 802 and the application server 808, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 810 can include several separate data tables, databases or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. One or more non-transitory computer-readable storage media having collectively stored thereon instructions that, when executed by one or more processors of a system, cause the system to:
   store a request to perform one or more operations in a queue;
   as a result of the request remaining in the queue after a period of time, at least:
   associate a cancellation token to the request by at least including a uniform resource identifier for the cancellation token in the request; and
   transmit a copy of the request to a different second system, the copy of the request having a lower priority than the request;
   cause the second system to generate a remote cancellation token associated with the copy of the request;
   detect removal of the request from the queue by the system;
   confirm completion of the request by the system; and
   use the cancellation token to propagate a cancellation signal to the second system via the uniform resource identifier and the remote cancellation token, the cancellation signal causing the second system to at least:
   cancel processing of the copy of the request; and
   use the remote cancellation token to propagate a second cancellation signal to a different third system having a different copy of the request.

2. The one or more computer-readable storage media of claim 1, wherein confirming completion of the request by the system includes triggering the cancellation token at the system.

3. The one or more computer-readable storage media of claim 1, wherein transmitting the copy of the request to the second system includes transmitting the copy of the request according to a schedule.

4. The one or more computer-readable storage media of claim 1, wherein associating the cancellation token with the request includes inserting, into metadata of the request stored in the queue, unique identification information for the cancellation token.

5. The one or more computer-readable storage media of claim 1, wherein propagating the cancellation signal includes sending a message to a request processing entity associated with the cancellation token.

6. The one or more computer-readable storage media of claim 1, wherein the cancellation token is linked to one or more resources local to the system.

7. The one or more computer-readable storage media of claim 1, wherein:
   propagating the cancellation signal includes receiving a predetermined number of cancellation signals, equal to or less than the total number of copies of the request, before causing one or more unprocessed copies of the request to be cancelled; and
   the predetermined number of cancellation signals is at least two.

8. The one or more computer-readable storage media of claim 1, wherein causing cancellation of the processing of the copy of the request includes causing removal of the copy of the request from a local queue of the second system, terminating processing of the copy of the request by the second system, or disregarding results of processing the copy of the request by the second system.

9. A computer-implemented method, comprising:
   receiving a copy of a request from a system that stores the request in a first queue;
   storing the copy of the request in a second queue, the copy of the request having a lower priority than the request;
   transmitting a different copy of the request to a different system in response to the request remaining unprocessed and after the copy of the request remains in the second queue for a predetermined period of time, to cause the different system to associate a remote cancellation token with the different copy of the request;
   associating a cancellation token with the copy of the request in the second queue and the different copy of the request by at least including a uniform resource identifier for the cancellation token in the copy of the request and the different copy of the request;
   detecting removal of the copy of the request from the second queue based at least in part on the cancellation token, wherein the removal is initiated by processing of the copy of the request; and
   sending, via the cancellation token, a cancellation signal to the different system to cause the different system to at least:
   cancel processing of the different copy of the request; and
   propagate, using the remote cancellation token, the cancellation signal to the system.

10. The computer-implemented method of claim 9, wherein the cancellation signal indicates to the system to cease processing the request.

11. The computer-implemented method of claim 10, wherein:
    sending the cancellation signal to the different system further includes causing the different system to respond with a signal indicating a quantity of systems which have committed to processing the request.

12. The computer-implemented method of claim 11, further comprising further deprioritizing the copy of the request based at least in part on receiving the signal indicating the quantity.

13. The computer-implemented method of claim 9, wherein storing the copy of the request includes creating the cancellation token and writing a uniform resource locator for the cancellation token on to the copy of the received request.

14. The computer-implemented method of claim 9, wherein the different copy of the request has a priority that is lower than the request.

15. The computer-implemented method of claim 9, wherein the system and the different system are in different geographic locations.

16. The computer-implemented method of claim 9, wherein sending the cancellation signal to the different system includes submitting an application program interface call to a web service.

17. A system, comprising:
    one or more processors; and
    memory with instructions that, when executed by the one or more processors, make the system:
    queue a request with a processor of the one or more processors;
    as a result of the request remaining unprocessed after a predetermined grace period, transmit a copy of the request having a lower priority than the request to a plurality of other processors, the processor and the plurality of other processors forming a coordinated processing system;

detect processing of the request by the processor;

send, via a cancellation token associated with the request, a cancellation signal to a different second processor of the plurality of other processors to cause the different second processor to at least:

cancel processing of the copy of the request; and propagate, using a remote cancellation token associated with the copy of the request via a uniform resource identifier for the cancellation token included in the copy of the request, the cancellation signal to a different third processor of the plurality of other processors.

18. The system of claim 17, wherein detecting processing of the request by the processor includes receiving a notification that the request has been dequeued by the processor.

19. The system of claim 17, wherein detecting processing of the request by the processor includes detecting that processing of the request has completed.

20. The system of claim 17, wherein:

transmitting the copy of the request to the plurality of other processors includes causing each processor of the plurality of other processors receiving the copy of the request to at least:

generate a respective remote cancellation token for the copy of the request; and associate the respective cancellation token with the copy of the request by entering, into a database, information associating the respective remote cancellation token with copy of the request.

21. The system of claim 20, wherein propagating the cancellation signal to the different third processor causes the different third processor to terminate processing of the copy of the request.

22. The system of claim 21, wherein the cancellation signal is an application program interface call to a web service management system and the application program interface call includes information identifying the cancellation token.

\* \* \* \* \*